(12) United States Patent
Gulas

(10) Patent No.: US 7,963,357 B2
(45) Date of Patent: Jun. 21, 2011

(54) POWER ASSISTED ELECTRIC BICYCLE

(75) Inventor: Stefan Gulas, Nussdorf (AT)

(73) Assignee: Spinwood Trading & Consulting Ltd., Limassol (CY)

( * ) Notice: Subject to any disclaimer, the term of this patent is extended or adjusted under 35 U.S.C. 154(b) by 168 days.

(21) Appl. No.: 12/225,184

(22) PCT Filed: Mar. 22, 2007

(86) PCT No.: PCT/AT2007/000139
§ 371 (c)(1),
(2), (4) Date: Sep. 16, 2008

(87) PCT Pub. No.: WO2007/106922
PCT Pub. Date: Sep. 27, 2007

(65) Prior Publication Data
US 2010/0065360 A1    Mar. 18, 2010

(30) Foreign Application Priority Data

Mar. 23, 2006   (AT) ...................................... 492/2006

(51) Int. Cl.
*B62M 23/02*  (2010.01)
(52) U.S. Cl. ...................... 180/205; 180/220; 180/65.31

(58) Field of Classification Search .................. 180/205, 180/220, 65.1, 65.245, 65.26, 65.31
See application file for complete search history.

(56) References Cited

U.S. PATENT DOCUMENTS

| | | | |
|---|---|---|---|
| 598,819 A * | 2/1898 | Scott .............................. | 180/220 |
| 3,533,484 A * | 10/1970 | Wood, Jr. ..................... | 180/205 |
| 3,884,317 A * | 5/1975 | Kinzel .......................... | 180/220 |
| 4,169,512 A * | 10/1979 | Ishikawa et al. .............. | 180/205 |
| 6,296,072 B1 | 10/2001 | Turner | |
| 6,341,660 B1 | 1/2002 | Schiller | |
| 6,598,693 B2 * | 7/2003 | Honda et al. .................. | 180/205 |
| 6,964,313 B2 * | 11/2005 | Phillips et al. ................ | 180/205 |
| 7,150,337 B2 | 12/2006 | Phillips et al. | |
| 7,156,780 B1 | 1/2007 | Fuchs et al. | |
| 7,195,088 B2 * | 3/2007 | Matsueda et al. ............. | 180/205 |
| 7,273,123 B2 * | 9/2007 | Perng ............................ | 180/205 |
| 2003/0213632 A1 | 11/2003 | Schless | |

* cited by examiner

*Primary Examiner* — Tony H. Winner
(74) *Attorney, Agent, or Firm* — Dykema Gossett PLLC

(57) ABSTRACT

A vehicle includes a frame, a pedal crank which is mounted on the frame to rotate about a first axis, a drive motor, a drive belt or drive chain for transmission of force from the drive motor to a drive wheel, with the drive wheel being mounted resiliently on the frame via a rocker. The pivot axis of the rocker in relation to the frame is coaxial with respect to the drive motor and coincides with the axis of a first gearwheel which is driven by the drive motor and about which the drive belt or drive chain is deflected.

8 Claims, 2 Drawing Sheets

POWER ASSISTED ELECTRIC BICYCLE

BACKGROUND OF THE INVENTION

1. Field of the Invention

The invention relates to a vehicle, which includes a frame, a pedal crank which is mounted on the frame in a manner so that it can rotate about a first axis, a drive motor, and a drive belt or drive chain for transmission of force from the drive motor to a drive wheel, with the drive wheel being mounted resiliently on the frame via a rocker.

2. The Prior Art

It is known to provide a vehicle such as a bicycle with a drive motor which drives the vehicle and at the same time with a pedal crank which is driven by the user of the vehicle. Substantially higher speeds can be achieved with such a vehicle as compared with conventional bicycles which are driven exclusively by muscular power As a result of the high travelling speed, efficient suspension of the wheels of the vehicle is of higher important than would be the case in conventional bicycles. The suspension of the rear wheel of such a vehicle is usually made via a rocker which is fastened in a swiveling manner to the frame and which rests on the frame by means of a spring or damping element. The drive of the drive wheel occurs in many cases through a chain which is guided on the one hand via a first gearwheel held on the frame and on the other hand via a second gearwheel fastened to the drive wheel. As an alternative to the chain, it is possible to provide a drive belt which is arranged as a toothed belt or a ribbed V-belt. In conventional vehicles, the drive chain or drive belt is held in the tensioned state by a tensioning member which especially compensates any changes in the distance between the first gearwheel and the second gearwheel. With such a drive arrangement, however, torque can be transmitted onto the drive wheel only in one direction, which means that it is only possible that the drive motor drives the drive wheel in the forward direction. It is not possible with this arrangement however to implement regenerative braking which provides the torque in the side opposite of the drive moment.

It has now been seen that this limitation for electrically driven vehicles is obstructive and impairs potential flexibility in the application and increase in the range of a battery charge.

It is the object of the present invention to avoid such disadvantages and to provide a solution which offers the highest possible flexibility in the arrangement of a drive for such a vehicle.

SUMMARY OF THE INVENTION

These objects are achieved in accordance with the invention in such a way that the pivot axis of the rocker in relation to the frame is coaxial with respect to the drive motor and coincides with the axis of a first gearwheel which is driven by the drive motor and about which the drive belt or drive chain is deflected.

The relevant aspect in the present invention is that, as a result of the special arrangement of the drive system, a tensioning element for the drive chain or drive belt can be omitted because the distance of the axes of the first gearwheel and the second gearwheel does not change by spring deflection of the drive wheel. Torque between the first and second gearwheel can thus be transferred easily in both directions. When the drive motor is arranged as an electromotor, it is not only possible to brake the drive wheel through the drive train, but it is also possible to feed back energy to the provide battery. But also in the case of drive by an internal combustion engine, it is useful to enable providing speed control via the drive motor.

It is especially important that the drive motor is coaxial to the first gearwheel. An especially compact arrangement can thus be achieved. In view of the constructional conditions, it is further advantageous when the first axis is arranged at a distance from the axis of the first gearwheel. In particular, the axis of the pedal crank should be situated before the axis of the first gearwheel.

It is especially preferable that the drive motor is arranged at least partly within the pivoting area of the pedal crank. This means that at least a part of the drive motor which needs to be provided with a sufficiently flat arrangement lies within the cylindrical area which is delimited in the axial direction by the circles which are covered by the pedal cranks during their rotational motion. As a result, not only an especially compact configuration is achieved, it is also possible to ensure an especially advantageous distribution of weight. Moreover, a relatively generously dimensioned rocker can further be realized.

A first preferred embodiment of the invention provides that the drive motor is rigidly connected with the rocker. In this embodiment, the spring deflection state of the rocker is influenced by the torque exerted by the drive motor. As an alternative to this it is possible to rigidly connect the drive motor with the frame, which represents a constructional simplification and simultaneously reduces the moment of inertia of the rocker in comparison with the above solution, through which the unsprung masses are also reduced.

It is especially preferable when the drive wheel is freely rotatable with respect to the pedal crank. It is thus possible to use the drive crank merely for control of the vehicle and to optionally generate power via a generator which is supplied to the electrical system.

The invention will now explained in greater detail by reference to embodiment shown in the drawings.

DETAILED DESCRIPTION OF THE PREFERRED EMBODIMENT

Figure 1:
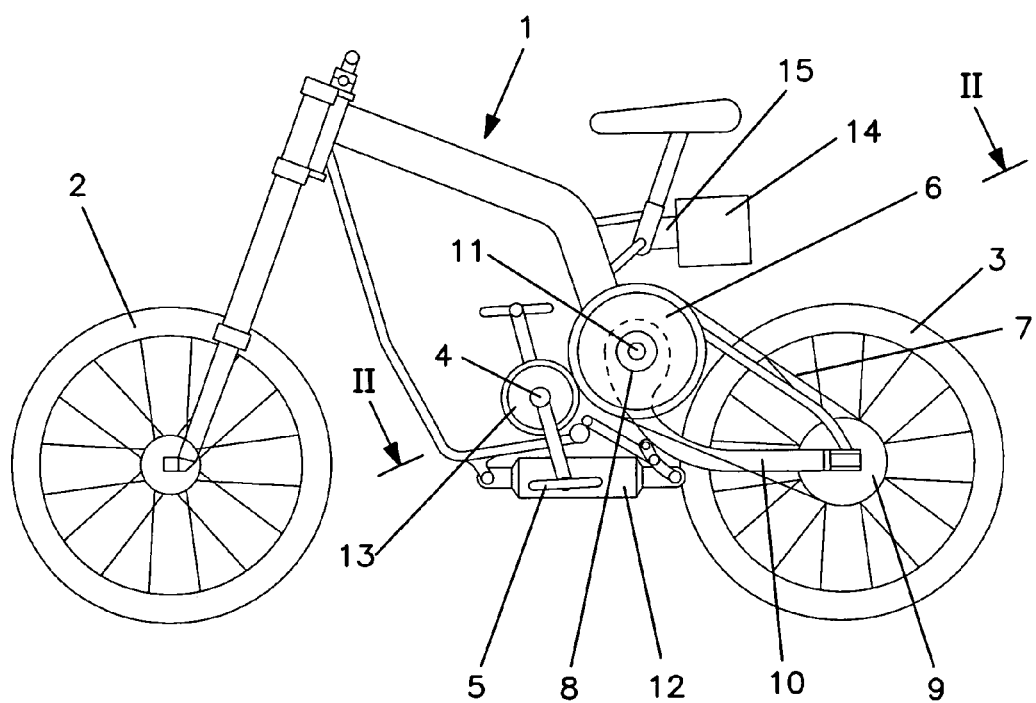
FIG. 1 shows a schematic representation of a vehicle in accordance with the invention.

The vehicle according to FIG. 1 consists of a frame 1, on which a front wheel 2 and a rear wheel 3 are arranged in the manner of a bicycle, which rear wheel is arranged as the drive wheel.

A pedal crank 5 which is rotatable about a first axis 4 is held on the frame 1. An electromotor 6 is fastened to frame 1 behind the pedal crank, which electromotor drives the drive wheel 3 via a drive chain 7. The drive chain 7 is guided via a first gearwheel 8 which is coaxial with respect to the drive motor 6 and a second gearwheel 9 which is coaxial with respect to the drive wheel 3. The drive wheel 3 is held on a rocker 10 which is held in a pivoting manner about an axis 11 on frame 1 which simultaneously represents the axis of the drive motor 6 and the first gearwheel 8 (see FIG. 2). The rocker 10 is supported on frame 1 via a spring element 12.

Figure 2:
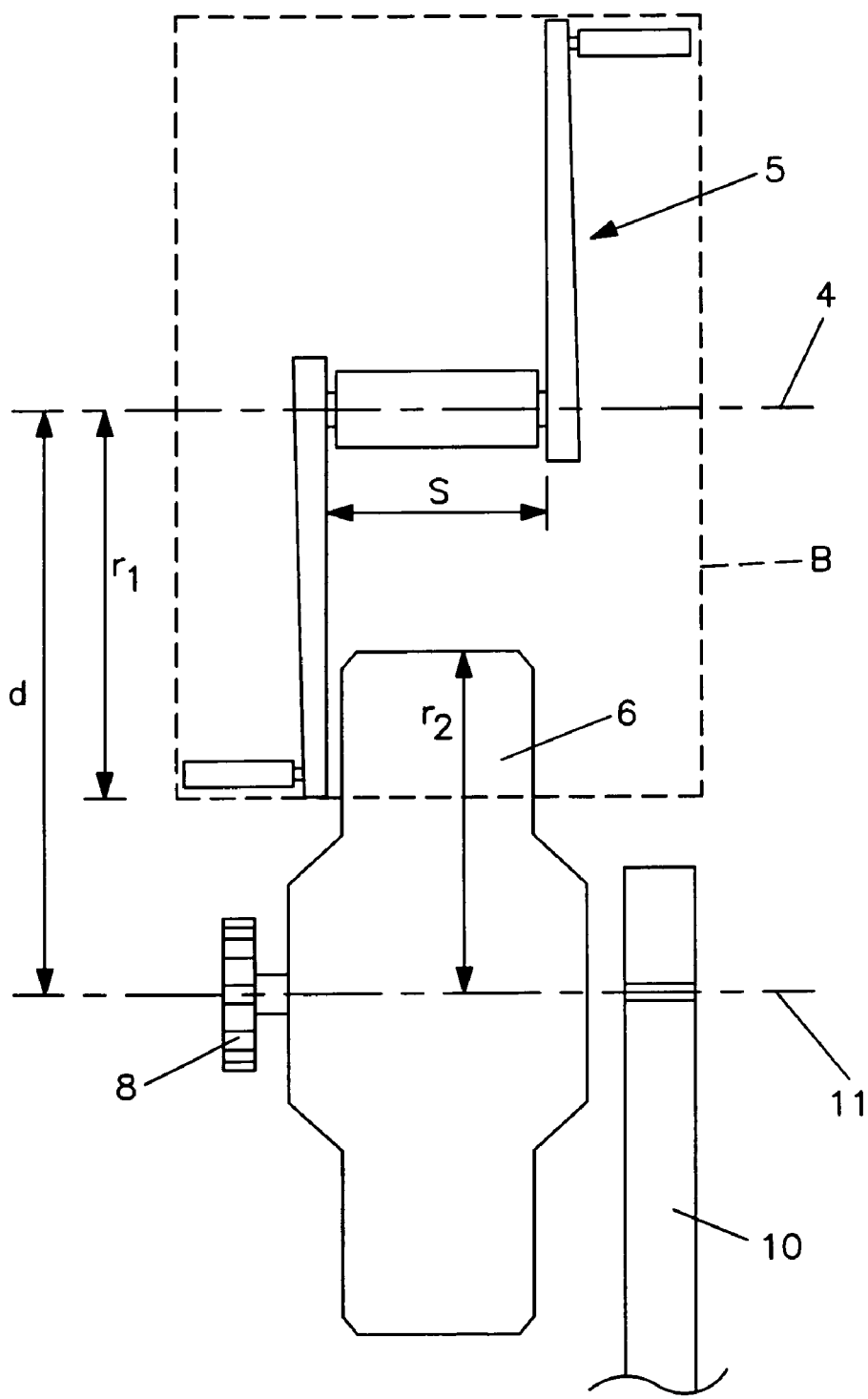
FIG. 2 shows a sectional view along line II-II in FIG. 1 on an enlarged scale.

FIG. 2 shows that the distance of the axes 4 and 11 is smaller than the sum total of the radii r1 of the pedal crank 5 and $r_2$ of the drive motor 6, so that the drive motor 6 is arranged at least partly within the pivoting area B of the pedal crank 5 which is shown with the broken lines. Notice must be taken however that the axis 11 of the drive motor 6 lie outside of the pivoting area B of pedal crank 5, which ensure that gearwheel 8 protrudes in the axial direction over the inner free space s between the pedal crank 5, which thus respectively improves constructional freedoms.

Pedal crank 5 is further connected with a generator 13 which generates electricity by actuating the pedal crank 5 by the user (not shown) of the vehicle, which electricity is stored in a rechargeable battery 14. At the same time, the drive motor 6 is supplied with power by the rechargeable battery 14. A control device is indicated with reference numeral 15 which triggers the drive motor 6 substantially depending on the actuation of the pedal crank 5.

Braking of the vehicle can be caused by a respective reversal of the drive motor 6, so that in thrust operation the same also generates electricity as a generator which is stored in the rechargeable battery 14. An especially advantageous use of the vehicle with respect to energy can thus be achieved in this manner.

The invention claimed is:

1. A vehicle, comprising a frame, a pedal crank which is mounted on the frame to rotate about an axis, a drive motor, a drive belt or drive chain for transmission of force from the drive motor to a drive wheel, with the drive wheel being mounted resiliently on the frame via a rocker having a pivot axis which in relation to the frame is coaxial with respect to the drive motor and coincides with an axis of a gearwheel which is driven by the drive motor and about which the drive belt or drive chain is deflected, and wherein the drive motor is located at least partly within a pivoting area of the pedal crank.

2. The vehicle according to claim 1, wherein the axis is spaced from the axis of the gearwheel.

3. A The vehicle according to claim 2, wherein the axis of the pedal crank is located forwardly of the axis of the first gearwheel.

4. The vehicle according to claim 1, wherein the drive motor is rigidly connected with the rocker.

5. The vehicle according to claim 1, wherein the drive motor is rigidly connected to the frame.

6. The vehicle according to claim 1, wherein the drive wheel is freely rotatable in relation to the pedal crank.

7. The vehicle according to claim 1, wherein the drive motor is an electromotor.

8. The vehicle according to claim 7, wherein the pedal crank is connected with a generator.

* * * * *